(12) United States Patent
Johnson et al.

(10) Patent No.: US 10,012,343 B2
(45) Date of Patent: Jul. 3, 2018

(54) PALLET STACKING BOARD CONSTRUCTION

(75) Inventors: Rodney B. N. Johnson, Barrie (CA); Andrew C. Udeschini, Sudbury (CA)

(73) Assignee: RIVER ROCK INDUSTRIES CORP., Barrie, ON (CA)

(*) Notice: Subject to any disclaimer, the term of this patent is extended or adjusted under 35 U.S.C. 154(b) by 0 days.

(21) Appl. No.: 13/882,241

(22) PCT Filed: Nov. 1, 2011

(86) PCT No.: PCT/CA2011/001230
§ 371 (c)(1),
(2), (4) Date: May 20, 2013

(87) PCT Pub. No.: WO2012/058764
PCT Pub. Date: May 10, 2012

(65) Prior Publication Data
US 2013/0248674 A1    Sep. 26, 2013

Related U.S. Application Data

(60) Provisional application No. 61/409,097, filed on Nov. 1, 2010.

(51) Int. Cl.
*F16M 13/00* (2006.01)
*F16M 11/20* (2006.01)
(Continued)

(52) U.S. Cl.
CPC ........... *F16M 11/20* (2013.01); *B29C 44/181* (2013.01); *B29C 67/20* (2013.01);
(Continued)

(58) Field of Classification Search
USPC ......... 248/346.02, 632, 633, 634; 108/51.11, 108/57.25
See application file for complete search history.

(56) References Cited

U.S. PATENT DOCUMENTS 3,295,278 A * 1/1967 Muhm .................. 52/223.6
3,565,017 A    2/1971 Jensen
(Continued)

FOREIGN PATENT DOCUMENTS

| EP | 1306312 | 5/2003 |
|----|---------|--------|
| JP | 3253615 | 2/2002 |

(Continued)

OTHER PUBLICATIONS

PCT Search Report in PCT/CA2011/001230 dated Feb. 13, 2012.
(Continued)

*Primary Examiner* — Steven M Marsh
(74) *Attorney, Agent, or Firm* — Manelli Selter PLLC; Edward J. Stemberger (57) ABSTRACT

A pallet stacking board comprising a laminate structure is provided in which a non-woven polypropylene geotextile fabric material is used to create a suitably shaped bag in which a rigid or semi-rigid polyurethane material is injected, and allowed to react and cure. The upper and lower exterior surfaces of the pallet stacking board are coated with a non-slip material which is preferably provided by a polyurethane coating material so as to provide a textured finish. The pallet stacking boards provide desirable non-slip properties while being readily manufactured using automated procedures.

19 Claims, 3 Drawing Sheets

(51) Int. Cl.
  *B29C 44/18* (2006.01)
  *B29C 67/20* (2006.01)
  *B65D 19/38* (2006.01)
  *B65D 19/00* (2006.01)

(52) U.S. Cl.
  CPC ......... *B65D 19/0002* (2013.01); *B65D 19/38* (2013.01); *B65D 2519/00034* (2013.01); *B65D 2519/00069* (2013.01); *B65D 2519/00273* (2013.01); *B65D 2519/00278* (2013.01); *B65D 2519/00343* (2013.01); *B65D 2519/00835* (2013.01); *B65D 2571/00043* (2013.01); *B65D 2571/00055* (2013.01)

(56) References Cited

U.S. PATENT DOCUMENTS

| | | | | |
|---|---|---|---|---|
| 3,709,733 A * | 1/1973 | Mautner | ................ | 428/56 |
| 3,911,834 A | 10/1975 | Quaintance | | |
| 4,042,127 A | 8/1977 | Brossia | | |
| 4,159,887 A | 7/1979 | Dick | | |
| 4,774,794 A * | 10/1988 | Grieb | ................ | 52/309.7 |
| 4,871,063 A | 10/1989 | Kumbier | | |
| 5,116,191 A | 5/1992 | Van | | |
| 5,465,812 A | 11/1995 | Petter | | |
| 5,918,800 A | 7/1999 | Goshorn et al. | | |
| 6,101,955 A | 8/2000 | Salce | | |
| 6,180,203 B1 * | 1/2001 | Unkles | ................ | 428/71 |
| 6,227,366 B1 | 5/2001 | Ekard et al. | | |
| 6,395,384 B1 * | 5/2002 | Adam | ................ | 428/319.3 |
| 2007/0283856 A1 * | 12/2007 | Berghmans et al. | ........ | 108/51.3 |

FOREIGN PATENT DOCUMENTS

| | | |
|---|---|---|
| JP | 2008-525289 | 7/2008 |
| WO | 2006071920 | 7/2006 |

OTHER PUBLICATIONS

PCT Written Opinion in PCT/CA2011/001230 dated Feb. 13, 2012.
Office Action in Japanese Patent Application No. 2013-535219 and English translation thereof, dated Jan. 6, 2016.

* cited by examiner

PALLET STACKING BOARD CONSTRUCTION

FIELD OF THE INVENTION

This invention relates generally to transport pallet assemblies and, more particularly, to a pallet stacking board to be used between stacked pallets.

BACKGROUND OF THE INVENTION

Currently many types of commodities are packaged on pallets or skids. In order to protect the top layers (in particular) of a commodity from damage caused by stacking, strapping, shipping or bumping, a pallet stacking board is used between stacked pallets.

Currently, most typical pallet stacking boards are composed of a flat sheet of wood, masonite, or laminated paper. These pallet stacking boards are generally fabricated by cutting the proper size flat piece from a sheet of plywood, masonite, or laminated paper. The stacking board is then placed over the top of one pallet before the next pallet is stacked on top of the first. Normally, the stacking board merely rests in place on top of the first pallet, and no additional strapping or like is used to hold the stacking board in place.

The advantage of using the stacking board is that it distributes the weight of the second pallet across the top of the first pallet, and additionally provides physical protection to the contents of the first pallet from the uneven surfaces of the bottom of the pallet being stacked on top of the first pallet.

The use of pallet stacking boards is most commonly done in transport situations wherein pallets are stacked two high, such as in, for example, transport in a typical truck trailer or container. In these applications, the first pallet is positioned in the trailer or container, a stacking board is placed over top of the first pallet's contents, and a second pallet is placed on top of the stacking board. This process is repeated for each lower pallet in the trailer or container.

As a result, damage to the upper contents of the lower pallet is minimized, or eliminated. After use, the flat stacking boards can be easily stacked for re-use with other loads.

It is also possible to provide stacking boards having corner sections which assist in hold the stacking board in place. However, these corner sections make storage and re-use of the stacking boards more difficult, as well as both increasing the cost of the stacking boards, and increasing the likelihood of damage to the stacking boards.

As such, the industry prefers the use of flat stacking boards.

However, with wood, masonite or laminated paper stacking boards, the surfaces of the stacking board can be somewhat slippery so that the upper pallet can slip or slide off of the lower pallet during stacking. The pallets can also shift during transport of the trailer or container, and thus, can cause pallets to fall during unloading of the trailer or container, with the resultant damage to the pallet contents, and with safety implications for the unloading operator.

While adding non-slip surfaces to a wood, masonite or laminated paper stacking board of the prior art might be contemplated, this increases the cost of production by requiring additional steps to adhere the non-slip surface to the stacking board.

As such, providing an improved pallet stacking board which eliminates or ameliorates any or all of these disadvantages would be of benefit to the industry.

Therefore, to overcome these difficulties, it would be advantageous to provide a light-weight, pallet stacking board having a non-slip top and bottom surface, and which pallet stacking boards can be easily, inexpensively and rapidly produced.

SUMMARY OF THE INVENTION

An exemplary implementation of the pallet stacking board of the present invention comprises a laminated structure having upper and lower surface covering material layers, and a rigid or semi-rigid core layer comprising a foamed material. In particular, the rigid or semi-rigid core layer comprises a semi-rigid, or more preferably, a rigid, polyurethane foam material.

The upper and lower surfaces preferably include, or otherwise provide, a non-slip surfaces. These non-slip surfaces can be provided by the covering material layer itself (on the upper and/or lower surfaces), a coating applied to the covering material, or by any other suitable means. In one preferred option, a non-slip coating is provided by a coating material that has been applied to the upper and/or lower surfaces of the covering material layer. Preferably, the coating material forms a textured surface, on each of the upper and lower covering material surfaces. The coating can be applied to the covering material layers, preferably before, but also after, production of the pallet stacking board.

The cover material forming the upper and lower layer surface is preferably provided as a suitably shaped bag which is manufactured from a plastic or fabric material. One preferred cover material is based on a geotextile fabric material made from a plastic material, which plastic material is most preferably polypropylene. The fabric material can be woven but preferably, the fabric material is non-woven.

Additionally, the cover material fabric may include a "capping" layer which can be provided by use of a polypropylene fuzz, which is needle punched into a woven fabric and distributes a "fuzz" material which is, for example, positioned 80% on the one side of the cover material fabric and 20% on the other side of the fabric. When the "fuzz" material is located on the external side of the cover material, this alone can provide slip-resistance on the exterior of the bag, and can allow for mechanical adhesion of capped material to the core layer.

When the "fuzz" material is located on the internal side of the cover layer, it preferably acts as a binding agent which physically adheres to the foamed rigid or semi-rigid material, formed in the pallet stacking board of the present invention. The 20% of the "fuzz" located on the external side of the pallet stacking board can also be used to physically bind with a coating agent applied to the exterior surface.

A most preferred cover material is based on a non-woven, geotextile fabric which is manufactured from a polypropylene staple fiber, wherein the fibers are randomly oriented and form a cohesive/stabilized needle punched fabric. Such products are widely available, and have a relatively smooth surface on one side, and a felt-like, fuzz surface on the opposite side. The geotextile fabrics are available in a variety of thicknesses, but to provide suitable strength and anti-puncture properties, preferably, the fabric used has a thickness that provides a 6 to 16 oz weight, and more preferably, an 8 to 12 oz weight. Most preferably, the fabric has a thickness that provides a weight of 10 to 11 oz, as these terms are used in the geotextile fabric industries.

Depending on the overall weight, strength, and puncture resistance properties desired from the pallet stacking board, the covering layer, and/or the resultant covering layer bag, is preferably formed from a suitable thickness and strength geotextile material. Generally, heavier geotextile materials, are more tear resistant, and more puncture resistant.

Polypropylene is selected as being a preferred cover material since it can be easily bonded/welded with standard industry impulse heat sealing equipment in order to form a bag. However, other plastic materials, such as polyethylene, polyesters, or the like, or fabric materials such as cloth, burlap, or the like, might also be selected or included in the bag construction.

While the geotextile cover material may be used as is, in some situations, when used with a woven geotextile material, the cover material fabric can also be heat and/or pressure calendered prior to use so as to close up, or "seal" at least one side of the fabric, and thus prevent or reduce the amount of bleed-through of the liquid or semi-liquid core layer reactants, during the production process. By use of this technique, the user can control the porosity of the fabric material which can aid in controlling the rate at which gases and/or liquids can wet and/or be released from the bag.

However, non-woven geotextile materials are preferred, and suitable geotextile materials to form the cover material fabric are readily available from suppliers such as Albarrie Canada Limited or from Thrace-LINQ Inc., although other similar materials can be used.

The non-woven cover material fabric can be used, in some applications, as supplied, from the manufacturer.

However, preferably, one side of the covering material layer is coated (and preferably, pre-coated) with a texturing, coating material, which can also act to seal the coating material layer. In one preferred embodiment, the cover material fabric is pre-coated by passing the fabric through an extrusion coating process, which applies a layer of a polypropylene/polyethylene copolymer, and applies the coating in a fashion so as to form a textured surface. The coating is preferably applied at a thickness of between 0.002 and 0.005 inches, although other coating thicknesses might be used depending on the nature of the coating material, and the desired properties.

Additional materials can be included in the coating material, and these can include materials such as pigments, anti-slip agents, UV stabilizers, anti-microbial additives, or the like.

The bag material can be a simple white colour, but can also be more highly coloured so as to distinguish the pallet stacking board from the materials on the pallet. For example, the bag material can be coloured to be a bright green or yellow colour. The bag material can also be colour-coded, so as to differentiate the pallet stacking boards of one user, from another.

In production, the geotextile fabric material is cut into pieces according to a pre-set pattern, and these pieces are joined together by heat welding to form a bag having the desired dimensions. Side panels can be used to assist in forming a suitable "bag", for use. For a common pallet stacking board, the bag preferably has a width and length of between 40 and 150 cm, and more preferably between 80 and 120 cm. In a most preferred embodiment, the bag has a length and width of between 100 and 110 cm.

Alternatively and preferably, a pre-coated, cover layer is folded in half, and the folded layers form the basis for the bag structure. No side panels are required, in this option. As such, in this approach, the preferably pre-coated cover material is folded so that the coating material is on the exterior surfaces of the bag, and the felt surfaces from the geotextile material, are on the interior of the bag. The remaining edges of the bag can be heat sealed so as to form a bag structure.

The corners of the bags are preferred angled and truncated on a 45° angle about 10 cm from the corner point, in order to allow the stacking panels to be more easily placed into position on the pallet. This also generally allows the bag to be more easily filled with the core material, and reduces the possibility of corner breakage during use.

A filler hole of between 2 to 20 cm is left in the bag during bag production to allow the materials forming the core material to be inserted into the bag construction.

The bag preferably has a depth of between 1 and 20 cm, and more preferably between 1.5 and 5 cm. A most preferred depth, however, is about 2 cm. Once the bag construction is complete, it can be filled with a core material using the filler hole.

The core material is any suitable material which can fill the bag to produce a rigid or semi-rigid core layer within the bag. While this can include materials such as expanded polystyrene or the like, a most preferred material is a polyurethane material, and preferably, a polyurethane foam material.

In a most preferred embodiment, the polyurethane is provided as a two-part expanding polyurethane foam, which is injected into the interior of the bag, and allowed to foam, expand and cure. A variety of foamed materials can be used, provided that they have suitable density, flexibility and strength properties, for their intended market. Examples of these values are provide hereinbelow.

The foaming operation is preferably conducted while the bag is held within a suitably shaped mould. This controls the final shape of the pallet stacking board, and allows the polyurethane materials to foam under pressure. As a result, the density of the foam is increased, and the foam is caused to expand, and fill the bag.

Once the core material has cured, the pallet stacking panel is ready for use. However, if the exterior surfaces of the bag have not been pre-coated, the outer surfaces of the bag can now be coated with a non-slip material in order to provide the bag of the pallet stacking board to have a suitable coefficient of friction for use as a pallet stacking board, and/or to provide a textured surface appearance.

DETAILED DESCRIPTION OF THE PREFERRED EMBODIMENTS

The general production methods to produce polyurethane foams are well known to the skilled artisan, as is the general chemistry for production thereof. For example, the following diagram describes in general the reaction of a process to prepare a typical polyurethane material produced from an isocyanate and a polyol resins:

where R and R' are used to designate any of a variety of suitable alkyl or aromatic groups.

Depending upon the type of foam structure that is required by a specific application, the isocyante and/or polyol resin systems may selected according to their molecular weight. For example, low molecular weight materials tend to promote the formation of a more rigid material. To achieve a semi-rigid material, typically, a medium molecular weight resin system is typically used. To achieve a flexible foam, a high molecular weight resin system would preferably be used. However, this selection approach is merely a guideline as to the proper selection of resin components.

For the purposes of the present invention, rigid or semi-rigid polyurethane materials are particularly preferred.

With respect to the isocyanate component, low molecular weight materials would contain from 20 to 30% isocyanate content. Medium molecular weight resins preferably contain from 12 to 20% isocyanate content, and high molecular weight resins preferably contain from 2 to 12% isocyanate content. All percentage values are by weight unless otherwise stated.

The isocyanate component of the polyisocyanate preferably has a functionality of 2.0 or more, and more preferably, a functionality of between 2.0 and 3.0, and can include diisocyanates and polyisocyanates of the aliphatic, alicyclic, or aromatic types.

The amount and type of isocyanate monomer used, or used in the production of the isocyanate resin component can directly affect the level of isocyanate groups present in the resin component. For example, hexamethylene diisocyante (HDI), has a monomeric level of isocyanate of 50% NCO. Other materials will have different monomeric NCO levels, such as, for example, Bis-(4-lsocyanatocyclohexyl) methanes (H12MDI) at 31.8% NCO; isophorone diisocyanate (IPDI) at 37.5% NCO; toluene diisocyanate (TDI) at 48% NCO; or methyl diphenyl diisocyanate (MDI) at 28-34% NCO. When reacted to form the isocyanate resin component, the monomeric NCO level will affect the isocyanate level of the resulting resin material.

The isocyanate is preferably a isocyanate selected from MDI, TDI, hexamethylene diisocyanate (HMDI), HDI, IPDI, TMXDI (1,3-bis-isocyanato-1-methylene ethylene benzene), or any of their oligomers, pre-polymers, dimmers, trimers, allophanates and uretidiones.

Further, suitable polyisocyanates useful in preparing the isocyanate resin component include, but are not limited to, toluene-2,4-diisocyanate, toluene-2,6-diisocyanatecommercial mixtures of toluene-2,4- and 2,6-diisocyanates, ethylene diisocyanate, ethylidene diisocyanate, propylene-1,2-diisocyanate, cyclohexylene-1,2-diisocyanate, cyclohexylene-1,4-diisocyanate, m-phenylene diisocyanate, 3,3'-diphenyl-4,4'-biphenylene diisocyanate, 4,4'-biphenylene diisocyanate, 3,3'-dichloro-4,4'-biphenylene diisocyanate, 1,6-hexamethylene diisocyanate, 1,4-tetramethylene diisocyanate, 1,10-decamethylene diisocyanate, 1,5-naphthalenediisocyanate, cumene-2,4-diisocyanate, 4-methoxy-1,3-phenylenediisocyanate, 4-chloro-1,3-phenylenediisocyanate, 4-bromo-1,3-phenlenediisocyanate, 4-ethoxy-1,3-phenylenediisocyanate, 2,4'-diisocyanatodiphenylether, 5,6-dimethyl-1,3-phenylenediisocyanate, 2,4-dimethyl-1,3-phenylenediisocyanate, 4,4'-diisocyanatodiphenylether, benzidinediisocyanate, 4,6-dimethyl-1,3-phenylenediisocyanate, 9,10-anthracenediisocyanate, 4,4'-diisocyanatodibenzyl, 3,3'-dimethyl-4,4'-diisocyanatodiphenylmethane, 2,6-dimethyl-4,4-diisocyanatodiphenyl, 2,4-diisocyanatostilbene, 3,3'-dimethyl-4,4'-diisocyanatodiphenyl, 3,3'-dimethoxy-4,4'-diisocyanatodiphenyl, 4,4'-methylene bis (diphenylisocyanate), 4,4'-methylene bis (dicyclohexylisocyanate), isophorone diisocyanate, PAPI (a polymeric diphenylmethane diisocyanate, or polyaryl polyisocyanate), 1,4-anthracenediisocyanate, 2,5-fluorenediisocyanate, 1,8-naphthalenediisocyanate and 2,6-diisocyanatobenzfuran.

Also suitable are aliphatic polyisocyanates such as the triisocyanate Desmodur N-100 sold by Bayer which is a biuret adduct of hexamethylenediisocyanate; the diisocyanate Hylene W sold by du Pont, which is 4,4'-dicyclohexylmethane diisocyanate; the diisocyanate IPDI (Isophorone Diisocyanate sold by Thorson Chemical Corp.), which is 3-isocyanatomethyl-3,5,5-trimethylcyclohexyl isocyanate; or the diisocyanate THMDI sold by Verba-Chemie, which is a mixture of 2,2,4- and 2,4,4-isomers of trimethyl hexamethylene diisocyanate.

Further examples of suitable isocyanate components include 2,4-tolylenediisocyanate, 2,6-tolylenediisocyanate, 4,4'-diphenylmethanediisocyanate, 4,4'-diphenylthere-diisocyanate, m-phenylenediisocyanate, 1,5-naphthalene-diisocyanate, biphenylenediisocyanate, 3,3'-dimethyl-4,4'biphenylenediisocyanate, dicyclohexylmethane-4,4'diisocyanate, p-xylylenediisocyanate, bis(4-isocyanatophynyl)sulfone, isopropylidene bis(4-phenylisocyanate), tetramethylene diisocyanate, isophorone diisocyanate, ethylene diisocyanate, trimethylene, propylene-1,2-diisocyanate, ethylidene diisocyanate, cyclopentylene-1,3-diisocyanates, 1,2-,1,3- or 1,4 cyclohexylene diisocyanates, 1,3- or 1,4-phenylene diisocyanates, polymethylene ployphenylleisocyanates, bis(4-isocyanatophenyl)methane, 4,4'-diphenylpropane diisocyanates, bis(2-isocyanatoethyl)carbonate, 1-methyl-2,4-diisocyanatocycloheane, chlorophenylene diisocyanates, triphenylmethane-4,4'4"-triisocyanate, isopropyl benzene-a-4-diisocyanate, 5,6-diisocnanatobutylbicyclo[2.2.1]hept-2ene, hexahydrotolylene diisocyanate, 1-methoxyphenyl-2,4-diisocyanate, 4,4'4"-triphenylmethane triisocyanate, polymethylene polyohenylisocyanate, tolylene-2,4,6-triisocyanate, 4,4'-dimethyldiphenylmethane-2,2'5,5'-tetraisocyanate, and mixtures thereof.

Preferably, however, the isocyanate component of the polyurethane foam is selected from the group consisting of methyl diphenyl diisocyanate (MDI), toluene diisocyanate (TDI), hexamethylene diisocyanate (HMDI), hexamethylene diisocyante (HDI), isophorone diisocyanate (IPDI), TMXDI (1,3-bis-isocyanato-1-methylene ethylene benzene), or any of their oligomers, pre-polymers, dimmers, trimers, allophanates and uretidiones.

The polyol portion of the polyurethane foam can be any suitable polyol commonly used within the art, and can include aliphatic or aromatic polyols, including polyester, polyether, and caprolactone-based polyols. The polyols include materials such as glycerol, 3-(2-hydroxyethoxy)-1,2-propanediol, 3-(2-hydroxypropoxy)-1,2-propanediol, 2,4-dimethyl-2-(2-hydroxyethoxy)-methylpentanediol-1,5, 1,2,6-hexanetriol, 1,1,1,-trimethylolpropane, or the like, or can be made by any suitable production method which would typically and preferably involve reacting ethylene oxide (EO), propylene oxide (PO) or butylene oxide (BO) with materials such as: 1,1,1-tris[(2-hydroxyethoxy)methyl]ethane, 1,1,1,-tris-[(2-hydroxypropoxy)methyl]propane, triethanolamine, triisopropanolamine, pyrogallol or phloroglucinol, in order to form a chain-extended polyol.

Still further, the polyol can be selected from renewable sources, such as soy, castor and vegetable oil, or the like, or combinations thereof.

As such, a wide variety of polyols might be used. Moreover, combinations of various polyols, or even different types of polyols, might also be used.

The ratio of isocyanate resin to polyol is typically identical to the ratios normally used in the prior art to cure these types of polymer systems. The skilled artisan will be aware that these ranges will vary, however, depending on the resins selected, and on the desired properties of the polymer system.

Further, as is known in the art, the foam structure of the polyurethane material is preferably provided by a blowing agent which acts to form the voids within the polyurethane as it reacts and solidifies. The nature, types and amounts of blowing agents which are used in polyurethane foam manufacture are well known to those skilled in the art, but can include, for example, water, carbon dioxide, hydrofluorocarbons, chlorinated fluorocarbons and the like. Again, though the skilled artisan will easily be able to determine suitable blowing agents.

Additionally, other additives such as catalysts or surfactants can be added to the reaction mixture in order to control various properties.

Catalysts, when used, can be amine based, including, for example, primary, secondary or tertiary amines or combinations thereof. The catalysts can also be metallic based, including, for example, tin, lead, bismuth based catalysts, or the like. Catalysts can be used which promote the formation of urethane linkages in the polyurethane based systems, by reaction of isocyanate groups and hydroxyl groups. These types of amine catalysts include, for example, triethylenediamine, N-methylmorpholine, tetramethyl-2,4-butanediamine, N-methylpiperazine, dimethylthanolamine, triethylamine, and the like; and organometallic compounds, such as stannous octanoate, dibutyltin dilaurate, dibutyltin di-2-ethylhexanoate, and the like.

The catalysts may be used alone or in combination with one another. The amount of catalyst typically used is a broad range of amounts, which usually ranges from 0.03 to 2.0 parts by weight, and preferably between 0.02 to 1.2 parts by weight based on the total weight of the composition, exclusive of the reinforcing materials.

Surfactants might also be added. By introducing surfactants, the foam materials can be made as closed cell or open cell depending upon the desired application. Where uniformity of cell structure is required, fine organic or inorganic particles may be used in a size range between 50 and 500 microns. Where random cell structure is acceptable, larger reinforcing particles may be used. Surfactants, when used, are preferably silicone based, although any suitable surfactant might be used.

Other materials can be included in the formulations of the present invention. For example, coupling agents, such as silane or titanates, may also be included in the preparation of the composition to improve the physical properties of the material. Where other properties are desired additives may be added to the composition including colorants, dry or liquid inks or pigments, fire and flame retardants, internal mold release additives, antistatic agents, and such other additives as required, and which are known within the industry.

As indicated above, once the foam is fully formed and cured, the final density is preferably less than 10 lbs per cubic foot. More preferably, the density is between 0.01 and 6 lbs per cubic foot, and even more preferred density will be in the range of between 3 and 5 lbs per cubic foot (pcf). A most preferred density is 4.75 pcf.

The flexibility of the polyurethane foam can, to a large extent, be controlled by selection of a resin having an appropriate molecular weight. For the preferred embodiment of the present application, a rigid or semi-rigid polyurethane core material is one that will have a flexibility such that it can be bent 30 to 90° degrees or more from the horizontal, without any significant cracking or breaking of the stacking board.

Preferably, the foam has a tensile break strength of between 25 and 75 psi, and more preferably, between 45 a 60, with 50 psi being a most preferred value.

The elongation at break value of preferred polyurethane materials, is preferably greater than 1%, and more preferably greater than 3%.

The production method used to produce the polyurethane material for the polyurethane core layers of the present invention will be similar to the techniques used in the prior art for other products. For example, for the present invention, the production method, or foam forming stage, is preferably conducted under heat and/or pressure, and is preferably accomplished by injecting a mixture of the two components of the polyurethane system into the preformed bag, and allowing the materials to react while maintaining the bag within a closed reaction mould. As such, an injection molding process which is conducted within the bag is a most preferred option.

Preferably, therefore, production of the polyurethane core layer of the pallet stacking board of the present invention utilizes traditional polyurethane foam production techniques. Typically the polyol and isocyanate resins are combined together with mixing. Mixing of the materials preferably involves the use of an efficient shear mixer to homogeneously blend either or both of the resin components together, and/or mix or pre-mix either component directly with any necessary additives. Then, after mixing the isocyanate and polyol components together, the resultant composition is introduced into the bag, which is located within a mould cavity, and then is caused to react to form the polyurethane foam.

The polyurethane reaction composition may be pumped, blown, sprayed, or poured into the bag held within the mould cavity, or the bag may be moved to the mould cavity shortly after the composition has been added, depending on the physical nature of the pre-polymer mixture. To improve the processing speed the mould and/or the composition itself, may be heated, thereby promoting a faster reaction.

Those skilled in the art will be aware that tooling should be provided which preferably will allow excess gasses to exit the formulation so as to allow the composition to expand. This venting can be achieved by gas release through the fabric of the bag, and/or by venting out of the filling hole. After the polyurethane has cured, the filling hole can be heat-welded shut, or the polyurethane materials themselves can essentially "glue" the filling hole closed, particularly, when the filling hole is at least partially clamped to a partially closed position, after filling. The filling hole preferably is maintained at least partially open so as to allow venting of the polyurethane foaming gases.

The foaming process can occur when, for example, the isocyanate from the blended pre-polymer resin reacts with moisture (water) which causes carbon dioxide gas to be liberated. A chemical blowing agent such as nitrogen, pentane, carbon dioxide, etc., may also be used directly or released in a reaction to form a foam. The foam can also be co-blown by combinations of materials such as a combination of water and a hydrocarbon material such as pentane, and with HCFC's or HFC's like HFC-245fa (as those terms are used in the industry). The foam may also be co-blown with gases like carbon dioxide or nitrogen, that are injected into the raw material, or into the mixing streams of the reactants.

Alternatively, water can be added to the reaction system, or some other blowing agent can be added to generate a gaseous material during the curing reaction. Preferably, the flexible material is such that it provides a foam material that once formed, is essentially fully cured and crosslinked. As such, the cured polyurethane foam will not "off gas" to any appreciable extent. Those skilled in the art would be aware of techniques to achieve this state.

The material of the present invention can be foamed under atmospheric conditions, but might also be produced in a system which is under a compressive pressure. Under these conditions, compression pressures of 0 to 1,000 psi (0 to 70.30 kg/cm2) can be applied.

The polyurethane foam material of use in the present invention can also be custom formulated and engineered for specific applications. The range of formulations preferably includes using rigid, or semi-rigid polyurethane foams that may include a range of organic and inorganic reinforcing materials which may be in the form of a particle or fiber with the said reinforcing materials being in a variety of densities, sizes and regular and irregular shapes.

The polyurethane foam can be produced having either a closed cell or open cell structure, in accordance with prior art techniques and practices. The cell size in the foam can be any suitable size, and this can be easily adjusted and modified by the skilled artisan. It can be noted that the density of the core layer can be modified to some extent by adjustment of the cell size. Preferred cell sizes are between 0.001 cm to 1 cm, and more preferably, between 0.001 cm and 0.5 cm.

Once the core layer has been formed and cured within the bag, a rigid or semi-rigid pallet stacking board of a suitable size and shape has been produced. In order to adjust the non-slip properties of the stacking board, the external surfaces of the pallet stacking board can be modified by an additional external coating of a suitable non-slip material. This material can be selected to meet or exceed the minimum "coefficient of friction" required within the local shipping industry to prevent the top pallet of material from slipping off a lower pallet of material.

A preferred coating material is provided by a single component polyurethane material which will preferably wet into the surface of the fabric material of the bag, and bond with a portion of the inner core layer. Alternatively, the coating material can be extruded onto the surface of the cover layer, so as to physically, chemically, and/or mechanically bond with the cover layer.

The coating material preferably leaves a durable, slightly pebbled finish on the external upper and lower surfaces of the panel.

Multiple coats of the coating material can be applied in order to provide or adjust the desired non-slip features.

BRIEF DESCRIPTION OF THE DRAWINGS

Embodiments of this invention will now be described by way of example only in association with the accompanying drawings in which.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention.

Figure 1:
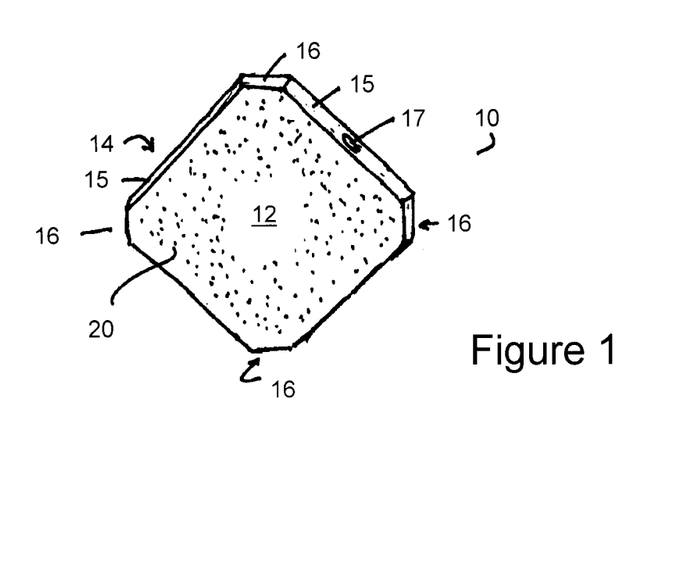
FIG. 1 is a perspective view of the pallet stacking board of the present invention.

Referring to FIG. 1 a perspective view of a pallet stacking board 10 is shown having an upper surface 12, and a mirror image lower surface 14. End panels 15 are provided around the perimeter of board 10, and join upper and lower surfaces 12 and 14, to form a bag (when empty). The upper and lower surfaces, and the end panels are all manufactured from the same material (although different materials might be used for different panels or surfaces), and in this case, are all non-woven polypropylene geotextile materials.

A filling hole 17 is provided in which reactants can be added to the interior of the bag (when empty)

Board 10 has a length and width of 101 cm by 106 cm, and a depth of 1.9 cm. Each corner of board 10 has been removed at a 45° angle 10 cm from the corner point to provide a truncated corner 16.

On the upper and lower surfaces (12, 14) of board 10, a sprayed-on coating material 20 has been applied so as to provide a pebbled appearance and texture.

Figure 2:
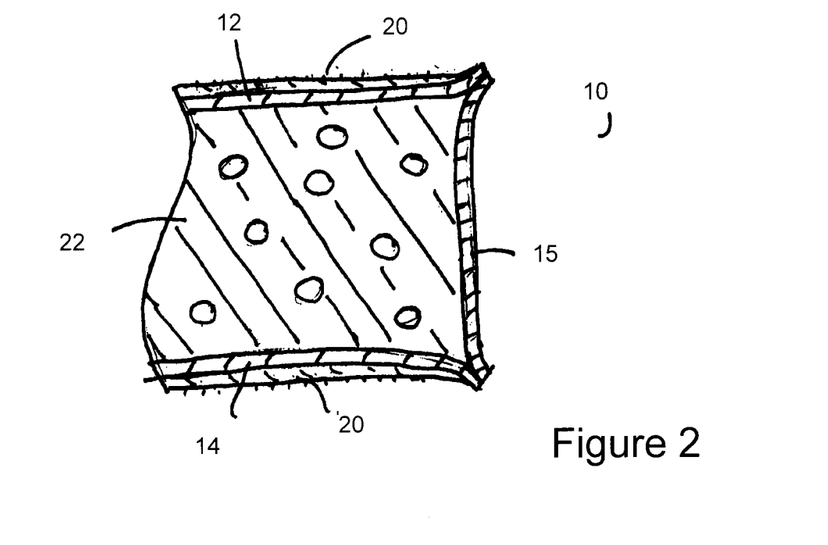
FIG. 2 is an enlarged cross-sectional view of a portion of the pallet stacking board shown in FIG. 1.

In FIG. 2, a cross-sectional view of a part of pallet stacking board 10 is shown. Core layer 22 comprised of a foam core of a polyurethane material is shown as providing support and rigidity for pallet stacking board 10.

Figure 3:
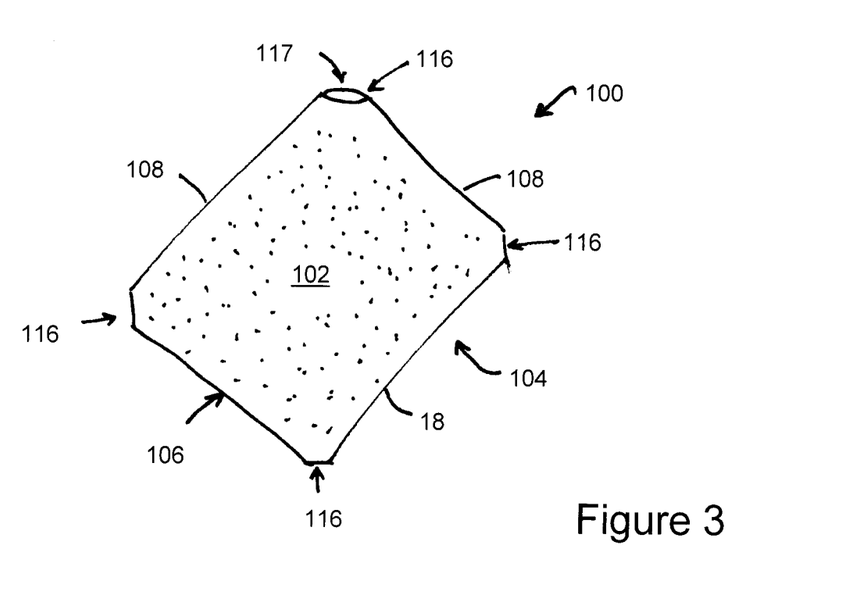
FIG. 3 is an alternative embodiment of a pallet stacking board according to the claimed embodiment.

In FIG. 3, an alternative embodiment of a pallet stacking board 100 is shown wherein the upper surface 102 and lower surface 104 are formed by folding a larger piece of fabric along edge 106. Corners 116 are cut from the panels, and the three edges 108, and three 3 corners 116 are heat welded to form a bag. The final corner 116 is left open, to act as a filling hole 117.

Pallet stacking board 100 is filled with a polyurethane foam, which is allowed to react in a mould, so as to maintain a proper shape, for board 100.

Figure 4:
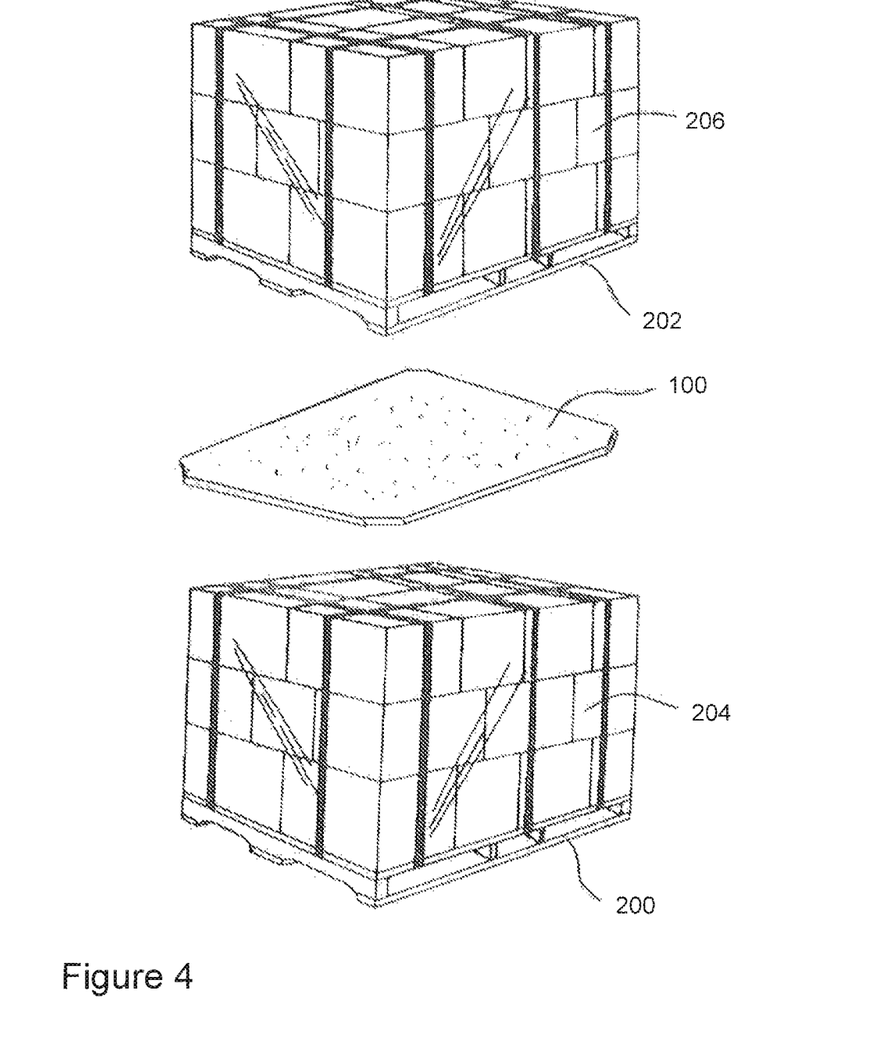
FIG. 4 is a perspective, exploded view of a pallet stacking board according to the claimed embodiment, in place between two pallets.

In FIG. 4, a pallet stacking board 100 is shown in combination with two pallets 200 and 202, both of which have been loaded with contents 204 and 206. In use, pallet stacking board 100 is placed on top of the contents 204 of pallet 200. Once pallet stacking board 100 is in place, pallet 202 (with contents 206) is lowered to rest on pallet stacking board 100.

Example 1

The following non-limiting example provides an indication of suitable compositions for a pallet stacking board according to the present invention. Of course, the skilled artisan will be well aware that modifications of the present formulation can be easily accomplished by simple experimentation.

A pallet stacking board according to the present invention was prepared according to the following formulations:

A bag for use in the production of the pallet stacking board was produced using a non-woven polypropylene geotextile material sold under the trade name 8300, from Albarrie, with a G2 calendar finish.

The bag had a length and width of 101 cm by 106 cm, and a depth of 1.9 cm. The bag was heat and pressure calendared to "seal" one surface of the bag, and thus reduce or eliminate the loss of liquid materials from the bag.

The bag was placed within a wooden mould of the same dimensions as the bag, and the mould was clamped shut.

A filling hole of 10 cm was used to inject a room temperature mixture of a two-component polyurethane material comprising 50% by weight of Elastochem-PIP2Ib—Part A, available from Elastochem Specialty Chemicals Inc., as an isocyanate mixture, and 50% of Elastochem-PIP2b—Part B, as polyol, and the resultant mixture was allowed to react and cure without any additional heating, after the filling hole had been closed. Approximately 2027 grams of the two-component mixture was used to fill the bag.

The isocyanate was an MDI-based material, and the polyol was a polyether polyol-based material, and the formulation included an amine catalyst, surfactants, and was water blown. A closed cell polyurethane foam with a compressive strength of 4.75 psi, was formed in the bag.

Once the polyurethane core layer was cured, the mould was opened, and the rigid bag was removed.

Subsequently, the upper and lower surfaces of the bag were then coated with a high viscosity, single component polyurethane material coating material available from Elastochem Specialty Chemicals Inc. as Elastochem WB130 (trade mark). A further, lower viscosity, coating of the same material was later re-applied in order to provide the upper and lower surfaces with a slightly pebbled texture and appearance.

The resultant pallet stacking board provided a durable pallet board having a suitable coefficient of friction to prevent unacceptable slippage of a stacked pallet.

The production of the pallet stacking board of the present invention, as herein described, is suitable for automated production, and thus, the cost of production can be minimized.

Example 2

A bag having the construction shown in FIG. 3 was produced from a non-woven 10.5 oz weight, geotextile fabric which had been coated on one side by extrusion coating the smooth side of the fabric with a coloured polypropylene/polyethylene copolymer to a thickness of between 0.002 and 0.005 inches. The fabric was folded to form the bag, so that the coated surface was on the exterior of the bag. The felt-like layer of the fabric was located on the interior surface of the bag. The corners of the bag were cut, and the edges and corners were heat welded together so as to seal the bag; other than for a fill hole left in one corner of the bag.

The overall size and shape of the bag was similar to that described in Example 1.

The bag was placed in a mould, and then filled with the same type and amount of polyurethane materials used in Example 1. The fill hole was partially closed by a clamp, so that gases could escape the bag, but the polyurethane material was largely kept within the confines of the bag.

The polyurethane material was allowed to react and foam under controlled pressure (caused by being enclosed in the mould), and then cure to the desired density, as previously described. After reacting for 4 minutes, to effect curing, the bag was removed from the mould.

The polyurethane material essentially intermixed with the felt-like material on the cover layer fabric, so as to be mechanically bonded to the pallet stacking bag. As such, the foamed layer was essentially fixed in place, within the fabric bag.

Further, since the bag was pre-coated with the coloured, non-slip material, a pallet stacking board according to the present invention was directly removed from the mould, and no additional coating steps were required. The filling hole was essentially sealed by the cured polyurethane resin.

The bag was tested for its non-slip feature, by resting a 5.2 kg (11.5 pound) concrete paver (21 cm×17.5 cm×6 cm), on the surface of the pallet stacking board. One side of the board was raised, and the angle where the paver began to slide along the board was measured. This is an indication of the non-slip capability of the board.

Preferably, the board of the present invention has an angle of friction, or non-slip angle, of more than 25 degrees, and more preferably, a non-slip angle of greater than 45 degrees. In this example, the board had a non-slip angle, as measured according to this test, of 55 degrees.

As such, in a further aspect, the present invention also provides a method for the production of a pallet stacking board, as previously described. In particular, the present invention provides a method for forming a pallet stacking board comprising:

(i) folding in half a geotextile fabric having a non-slip coating applied to one surface thereof, and a felt-like surface on the opposite surface thereof, so as to form a bag-like structure, wherein said non-slip coating is located on an exterior surface, and said felt-like surface is on an interior surface thereof;

(ii) heat welding the edges of said bag to seal said bag, except for a filling hole;

(iii) injecting a polyurethane-based material into said bag through said filling hole;

(iv) reacting said polyurethane-based material within said bag to form a rigid or semi-rigid foamed polyurethane material, wherein said polyurethane foam is adherent to said felt-like surface; and (v) sealing said fill hole Thus, it is apparent that there has been provided, in accordance with the present invention, a pallet stacking board, and a pallet stacking board production method, which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

In particular, it is to be noted that in the present application, the term "pallet stacking board" is used to refer to boards that are intended to be placed between pallets when one pallet is stacked on top of another. However, the skilled artisan will be aware that similar board might also be used in a wide variety of applications, such as boards for use in other non-slip applications. Accordingly, while the present application is described with particular reference to the pallet stacking board industry, the skilled artisan would be aware that the present application is equally applicable in other applications.

Additionally, for clarity and unless otherwise stated, the word "comprise" and variations of the word such as "comprising" and "comprises", when used in the description and claims of the present specification, is not intended to exclude other additives, components, integers or steps.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Also, unless otherwise specifically noted, all of the features described herein may be combined with any of the above aspects, in any combination.

Further, use of the terms "he", "him", or "his", is not intended to be specifically directed to persons of the masculine gender, and could easily be read as "she", "her", or "hers", respectively. Similarly, use of terms such as top, bottom sides, front, back, and the like, are used to describe the relative positioning of various components, when the device of the present invention, is used in its normal configuration.

Finally, while this discussion has addressed prior art known to the inventor, it is not an admission that all art discussed is citable against the present application.

What is claimed is:

1. A pallet stacking board for use in separating upper and lower stacked pallets, said pallet stacking board comprising:
    a board structure having opposing, generally flat upper and lower flexible fabric cover material layers defining respective continuously planar upper and lower surfaces of the board structure, and
    a semi-rigid core layer comprising a foamed material, between said upper and lower fabric cover material layers, wherein said foamed material is mechanically bonded to said upper and lower fabric cover material, and wherein said upper and lower fabric cover material layers have a non-slip surface,
    wherein said pallet stacking board is constructed and arranged to distribute weight from the upper pallet evenly over the lower pallet when said pallet stacking board is engaged between the upper and lower pallets via the respective continuously planar upper and lower surfaces.

2. A pallet stacking board as claimed in claim 1 wherein said semi-rigid core layer is expanded polystyrene, or a polyurethane material.

3. A pallet stacking board as claimed in claim 1 wherein said semi-rigid core layer is a semi-rigid polyurethane foam material.

4. A pallet stacking board as claimed in claim 3 wherein said polyurethane foam material has a density of between 3 and 5 lbs per cubic foot (pcf).

5. A pallet stacking board as claimed in claim 1 wherein said upper and lower fabric cover material layers are geotextile fabric.

6. A pallet stacking board as claimed in claim 5 wherein said geotextile fabric is a non-woven polypropylene product.

7. A pallet stacking board as claimed in claim 6 wherein said geotextile fabric is a non-woven polypropylene product having a smooth surface on one side, and a felt-like layer on the opposite side.

8. A pallet stacking board as claimed in claim 7 wherein said geotextile fabric has a weight of between 6 and 16 oz.

9. A pallet stacking board as claimed in claim 7 wherein said geotextile fabric has a weight of between 8 and 12 oz.

10. A pallet stacking board as claimed in claim 9 wherein said non-slip material forms a textured surface, on each of the upper and lower covering material surfaces.

11. A pallet stacking board as claimed in claim 1 wherein said non-slip surfaces are provided by a coating material applied to the fabric cover material layer.

12. A pallet stacking board as claimed in claim 11 wherein said fabric cover material layer has been pre-coated by passing said layer material through an extrusion coating process.

13. A pallet stacking board as claimed in claim 12 where said non-slip coating is a layer of a polypropylene/polyethylene copolymer.

14. A pallet stacking board as claimed in claim 13 wherein said polypropylene/polyethylene copolymer is applied at a thickness of between 0.002 and 0.005 inches.

15. A pallet stacking board as claimed in claim 14 wherein said non-slip coating additionally comprises pigments, anti-slip agents, UV stabilizers, or anti-microbial additives.

16. A pallet stacking board as claimed in claim 1 wherein said pallet stacking board has a width and length of between 80 and 120 cm, and a thickness of between 1.5 and 5 cm.

17. A pallet stacking board as claimed in claim 16, wherein the corners of the pallet stacking board are truncated on a 45 degree angle.

18. A pallet stacking board as claimed in claim 1 wherein said board has an angle of friction, or non-slip angle, of more than 25 degrees.

19. A pallet stacking board as claimed in claim 18 wherein said board has an angle of friction, or non-slip angle, of more than 45 degrees.

* * * * *